March 3, 1931. L. ROUANET 1,795,145
BRAKE OPERATING DEVICE FOR MOTOR VEHICLES
Original Filed March 9, 1925
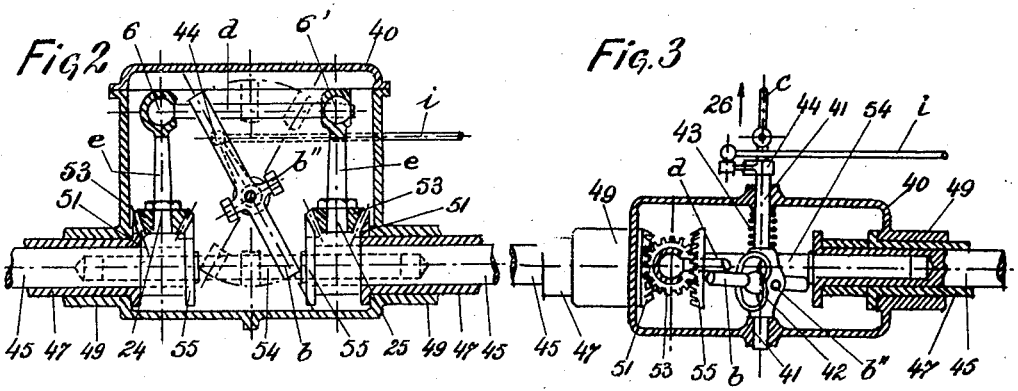
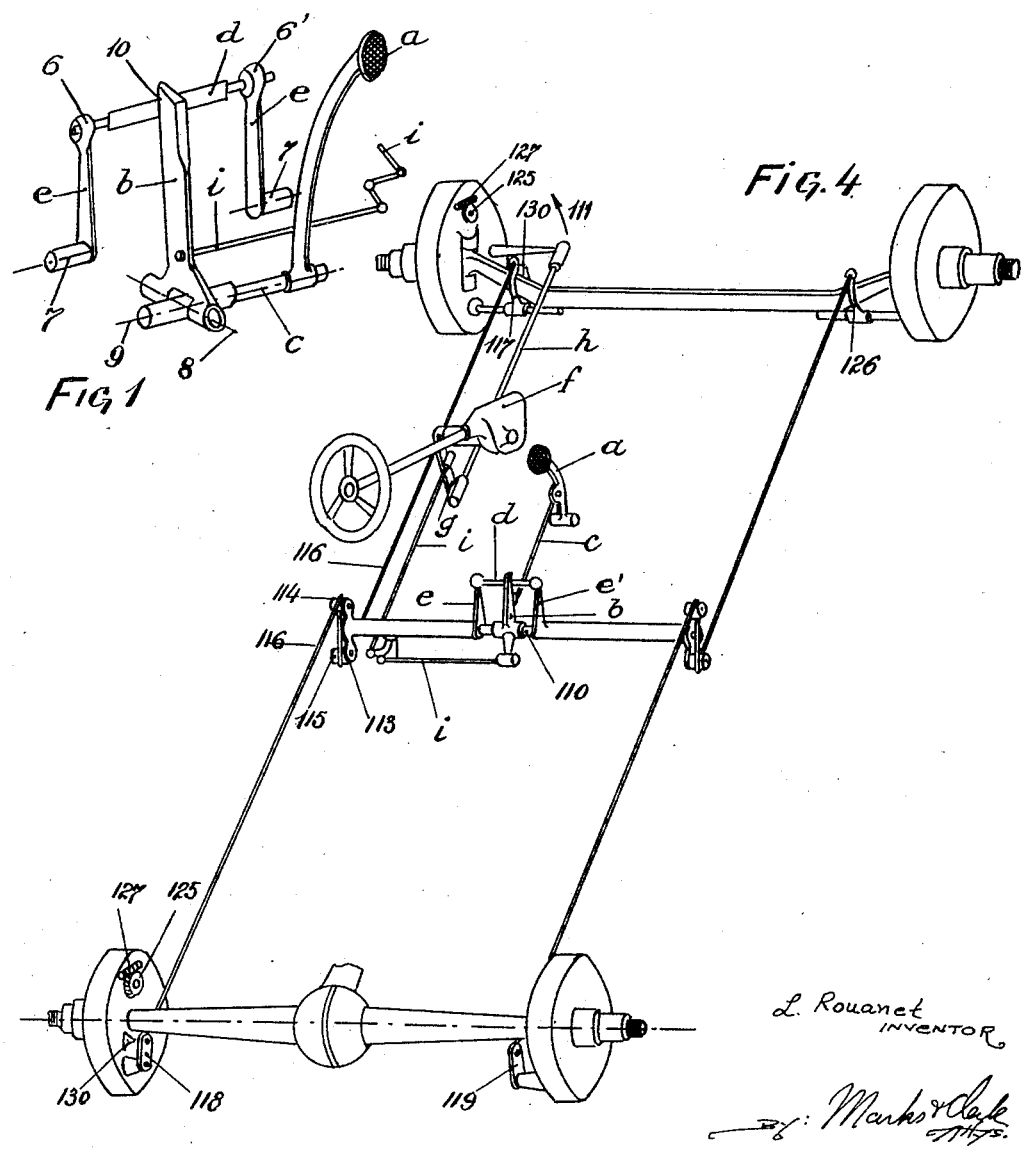

Patented Mar. 3, 1931

1,795,145

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, SEINE, FRANCE, A FRENCH COMPANY

BRAKE-OPERATING DEVICE FOR MOTOR VEHICLES

Original application filed March 9, 1925, Serial No. 14,255, and in France March 21, 1924. Divided and this application filed December 14, 1927. Serial No. 240,016.

The present invention relates to a brake operating device, which is applicable to all known brake systems for steering and driving axles, and which effects automatically an equal distribution of the braking applied to each of the steering and driving wheels during the running in a straight line of the vehicle, as well as a differential division of this force when the vehicle traverses a curve.

The said device, in which the initial action producing the braking movement acts, under the control of the steering mechanism of the vehicle, on a special arrangement by which it is suitably distributed on the wheels, is characterized in that it comprises in combination: a primary member receiving the brake pull from a pedal, a lever, an auxiliary motor, etc., two secondary members transmitting the brake pull to the wheels or to groups of wheels; and an intermediate member which, under certain conditions, divides the brake pull received from the primary member between the secondary members.

The invention is further characterized by the combination, in a motor vehicle of the distributing system above referred to with brake operating mechanisms associated with the wheels, and adjusting or controlling devices mounted on each of the brakes and acting on the brake shoes against the action of the operating cams so as to permit the take up of wear at the point where it is produced, so that the most favourable positions of the constituent members of the distributing system may be automatically maintained without modifying the original positions of the operating pedal, or equivalent, and of the interposed members.

This application is a division of my copending application Serial No. 14,255, filed March 9, 1925, which application has become Patent No. 1,750,904 on March 18, 1930.

The invention will be better understood with reference to the accompanying drawings, annexed as examples, and in which:

Fig. 1 is a perspective diagrammatic view showing an arrangement in accordance with the invention.

Fig. 2 is a longitudinal section of a mechanical arrangement according to Fig. 1;

Fig. 3 is a corresponding plan view with parts broken away;

Fig. 4 is a perspective diagrammatic view of a distributing system arranged on the underframe of a motor vehicle and combined with devices for taking up the play and operated from the exterior.

In the drawings, $a$ designates the member which is acted upon to operate the brakes. $b$ designates the primary member which is actuated by the member $a$ through the intermediary of any suitable member $c$ as shown. $d$ designates the intermediate distributing member, acting as a beam on the secondary members $e$ through which the braking force is transmitted to the brake shoes actuating devices.

$f$ (Fig. 4) designates the steering device of the vehicle and $g$ the steering lever which effects simultaneously: the steering movements of the wheels through the intermediary of a steering member $h$, and, through the intermediary of a rod $i$, a modification of the division of the braking force, by acting on the intermediate distributing member $d$.

In Fig. 1, the intermediate distributing member $d$ is connected by means of knuckles 6 and $6^1$ with the secondary members $e$, pivotally mounted about the shafts 7—7. The primary member $b$ oscillates about an axis 8 situated at right angles to the pivoting axis 9 of the member $c$ transmitting the angular movements of the pedal $a$.

The oscillatory movements of the member $b$ about its axis 8 is caused by the movements of the steering rod $i$ under the control of the steering mechanism (not shown).

The operation of this arrangement is as follows:

The braking force applied at $a$ is communicated to the intermediate member $d$ at 10, through the intermediary of the primary member $b$. The position of the point 10, relative to the knuckles 6 and $6^1$, is controlled by the position of the rod $i$ in such a manner that, when the vehicle is travelling in a straight line, the distance 6—10 is the same as the distance $6^1$—10, so that the total braking force is equally divided between each of the knuckles 6 and $6^1$, whereby the action of each of the secondary members e will be the same.

On curves, under the influence of the rod i, the member b rotates about the axis 8 and, according to the direction of travel of the vehicle, the point 10 is caused to move towards one or other of the knuckles 6 or 6¹, the total braking force being then unequally distributed upon each of the knuckles 6 and 6¹, whereby the action of each of the secondary members is no longer equal. The difference is used to obtain a differential braking effect on the wheels or groups of wheels of the vehicle, the differential effect being obviously proportional to the angular value of the steering movement.

The Figs. 2 and 3, which represent, respectively in elevation and plan, a mechanical arrangement according to the diagrammatic view of Fig. 1, relate to a form of construction in which each of the secondary members e acts on a complementary balancing device, causing its action to be divided between each of the wheels of a group of two wheels, said devices being enclosed in the casing 40 of the distributing device.

The intermediate distributing member d is supported on knuckles 6 and 6¹ of the secondary members e, and divides the initial strain communicated from the primary member b between the said secondary members, equally when the vehicle is travelling in a straight line or differentially on curves, said member b being mounted so as to rotate about the axis b'' of a hollow member 42 adapted to rotate in a plane at right angles to the said axis b'' as shown at 41. The member b acts on the intermediate member d while bearing against a rod 54, forming a cross bar, and centrally located within the shafts 45. A spring 43 coiled around the trunnion 41 inside the casing 40, and bearing against the wall of the said casing, serves to separate the primary member b from the intermediate member d. The division of the initial strain is again obtained through the intermediary of the member i, connected to a lever 44 secured to the trunnion 41 of the hollow member 42, outside the casing 40.

The trunnion 41 serves at the same time for transmitting to the primary member b the pull of the rod c, and the angular displacements of the lever 44 connected to the steering mechanism (not shown).

This latter arrangement involves the use of a perfectly water tight casing and enables the external actuating mechanism to be simplified.

The secondary members e are pivotally mounted on the shafts 45 and each of said members comprises a balancing pinion 53, adapted to freely rotate on the spindles 24 and 25.

Between the shafts 45 and the extensions 49 of the casing 40 are mounted tubular shafts 47 said shafts being adapted to rotate. The shafts 45 and 47, each of which is adapted to actuate the brake of one wheel, are provided at their ends with toothed sectors 55 and 51 respectively, the toothed sectors 51 engaging one side of the balancing pinions 53, whilst the toothed sectors 55 engage the other side of the said pinions.

Owing to this arangement the action of the secondary members e is equally distributed between each of the shafts 45 and 47, and from these shafts said action may be in turn suitably distributed on the wheel brakes.

The operation of this device is as folows: If the brakes are applied when the vehicle is travelling along a straight line, the hollow member 42 moves in the casing 40 in the direction of the arrow 26 (Fig. 3) and forces the primary member b against the cross bar 54, and centrally upon the intermediate member d, through which the pressure is equally transmitted to each of the secondary members e, which, in turn, transmit this force equally to the concentric shafts 45 and 47 each of which actuates the brake of one of the wheels of the controlled group.

On curves, the hollow member 42 is angularly moved about the trunnion 41 through the intermediary of the steering rod i, connected to the steering mechanism, and it actuates the primary member b which, still bearing against the cross bar 54, no longer acts centrally on the intermediate member d, whereby the force on one of the secondary members e is increased whilst it is reduced on the other. Each of said differential actions is then equally distributed between the shafts 45 and 47 through the intermediary of the balancing pinions 53.

In Fig. 4 a distributing device of the braking force of the kind described is diagrammatically illustrated as arranged on the frame of a motor vehicle having brakes on the four wheels.

The braking force applied to the pedal a is transmitted to the primary member b through the brake rod c. The primary member is adapted to move relative to a shaft 110, under the control of the steering member i connected to the lever g of the steering mechanism f. The member b divides the total braking force between the secondary members e and e¹. The member i is so arranged and adjusted that the braking force will be equally divided when the vehicle is moving in a straight line, and differentially divided when the vehicle is moving on curves.

Assuming that the vehicle is turned in the left hand direction, as shown by the arrow III, the primary member b is moved so as to cause an increased effort on the secondary member e and an effort reduced by the same amount of the secondary member e¹.

According to the example illustrated, the member e is provided with a double lever 113, having rollers 114 and 115 on which passes the string 116. This latter is connected, on one end, to the operating lever 117 of the front-left brake and, on the other end, to the operating lever 118 of the rear-left brake, whilst the member $e^1$ is provided with the same mechanical device acting in the same way on the group of brakes situated at the right hand side of the vehicle.

The arrangement of the string 116 and rollers 114 and 115 serves to effect in a proportional manner, the automatic division of the braking force of the secondary member $e$, between the levers 117 and 118, the values of the individual braking forces in front and at the rear of the vehicle being preferably such that they correspond to the maximum gripping power of the front and rear wheels respectively.

When the vehicle is turned to the left, as already described, the total braking force of the group of wheels that describe the arc of smaller radius is thus increased, the relative braking forces applied to each of the front and rear wheels remaining properly proportioned owing to the arrangement 113—114—115, whilst the total braking force applied to the group of wheels that describe the arc of greater radius is reduced with the same quantity. Of course, the arrangement may act in a manner reverse to that just described.

The invention also relates to the automatic division between the brakes, always in proper proportion, of the braking force applied at $a$, and this in spite of differences resulting from play between or bad adjustments in the interposed brake rods. However, when the play reaches an important value, it may cause a considerable angle of lag between the secondary members $e$ and $e^1$, sufficient to prevent the operation of the distributing device. Under such conditions the intermediate member $d$ may assume an abnormally inclined position, which may interfere with the displacement of the primary member $b$.

To obviate this disadvantage, and at the same time to insure that the operation of the brake shall remain constant (which is an absolute necessity for the operation of the distributing member), the complete brake arrangement is combined with adjusting devices 125 which act separately, and in any desirable manner, on the brake shoes of each wheel, to take up the play by spacing apart the enclosed parts of each brake against the action of the operating levers 117, 118, 119 and 126, in such a manner that, by operation of the members 125, the initial positions of the members 117, 118, 119 and 126, and consequently that of all the members or parts of the distributing device, as well as that of the point of application of the braking force may be restored, by taking up the play at the point where it is produced, especially inside the brake drums.

To render such adjustment practical, the members 125 may for example be operated by means of nonreversing screws 127 disposed outide the brake drums. In this manner, immediate and accurate adjustment may be easily effected on a finished vehicle without having to touch the enclosed members (steering members, distributing member and pedal) to which access is difficult.

To avoid taking up the play produced on one of the rear wheels by acting on the adjusting device 125 of a front wheel (which may occur owing to the fact that the wheels are connected together by means of the brake rods, and also in view that the play may be taken up in an equal manner on each side of the vehicle, so as to adjust any possible angle of lag between $e$ and $e^1$, marks or the like, 130, are located on the fixed parts of the brake drums, or on the vehicle axles, opposite the levers 117, 118, 119 and 126, to indicate the normal positions of the said levers.

Thus, when, owing to the play, the pedal $a$ reaches the end of its travel, it will be sufficient to operate the members 125, in such a manner that, for a given amount of tightening, the four above mentioned levers are restored to their initial positions indicated by the marks 130.

As a considerable amount of play may take place in the brake rod, indicated marks may also be provided on the casing of the distributing device, or on any other fixed parts, to indicate the normal positions of the members of the said device, corresponding to the normal positions of the levers 117, 118, 119 and 126.

By the provision of the said adjusting devices, it is a simple matter to restore all the members of an old vehicle in their correct positions, technically determined by the manufacturer without trial and without errors.

Claims:

1. In a brake arrangement comprising a main brake operating member, a primary member connected therewith and operated thereby, two secondary brake operating members and brake shoe operating devices connected to the said secondary brake operating members, an intermediate member and the primary member bearing on the intermediate member and being movable from end to end thereon, the intermediate member having ball and socket connections with the ends of the secondary members, shafts mounted at the other ends of said secondary members, stationary journals, tubular shafts in which said last mentioned shafts are rotatably mounted, toothed pinions on the secondary members, toothed pinions on the shafts and toothed pinions on the tubular shafts whereby the braking force imparted to each of the secondary members is in turn equally distributed between the corresponding shafts and tubular shafts.

2. In a brake arrangement comprising a main brake operating member, a primary member connected therewith and operated thereby, two secondary brake operating members and brake shoe operating devices connected to the said secondary brake operating members, an intermediate member, the primary member pivotally mounted into a hollow member tiltable about a stationary axis, a stationary support, said primary member bearing at one end against said stationary support whilst its other end is adapted to be moved longitudinally relative to and from end to end of the intermediate member whilst bearing thereon, means to vary the pressure of the primary member on the intermediate member and means to oscillate the hollow member about its pivotal connection.

3. A brake device arrangement comprising a main brake operating member, a primary member connected therewith and operated thereby, two secondary brake operating members and brake shoe operating devices connected to the said secondary brake operating members, the primary member acting on the secondary members through the lever arms of an intermediate member and being movable from end to end relative to said intermediate member, means controlled by the steering mechanism and adapted to modify the values of either of the said lever arms when the front wheels are deflected and marks enabling the normal positions of each of the primary, intermediate, secondary members and brake shoe actuating devices to be accurately adjusted.

LOUIS ROUANET.